United States Patent
Hillström

[11] Patent Number: 6,113,064
[45] Date of Patent: Sep. 5, 2000

[54] OUTLET VALVE

[75] Inventor: Anders Hillström, Huddinge, Sweden

[73] Assignee: Alfa Laval AB, Lund, Sweden

[21] Appl. No.: 09/117,676

[22] PCT Filed: Feb. 26, 1997

[86] PCT No.: PCT/SE97/00321

§ 371 Date: Aug. 4, 1998

§ 102(e) Date: Aug. 4, 1998

[87] PCT Pub. No.: WO97/32151

PCT Pub. Date: Sep. 4, 1997

[30] Foreign Application Priority Data

Feb. 28, 1996 [SE] Sweden .................................. 9600732

[51] Int. Cl.[7] ...................... F16K 31/143; F16K 31/163; F16K 31/363; F16K 31/383

[52] U.S. Cl. ......................... 251/63.5; 251/118; 251/120; 251/144

[58] Field of Search .................... 251/63.5, 144, 251/62, 319, 367, 118, 120, 121

[56] References Cited

U.S. PATENT DOCUMENTS

| | | |
|---|---|---|
| 960,801 | 6/1910 | Bonroe . |
| 3,125,320 | 3/1964 | De Frees .................................. 251/62 |
| 3,415,486 | 12/1968 | De Frees .................................. 251/63.6 |
| 3,593,959 | 7/1971 | Greene .................................. 251/63.6 |
| 3,949,963 | 4/1976 | Aoki .................................. 251/63.6 |
| 4,023,355 | 5/1977 | McDonald .................................. 251/63.5 |
| 4,934,667 | 6/1990 | Pees et al. .................................. 267/64.21 |
| 5,671,902 | 9/1997 | Gauthiere et al. .................................. 251/63.5 |

FOREIGN PATENT DOCUMENTS

| | | |
|---|---|---|
| 2359316 | 6/1975 | Germany . |
| 186479 | 8/1956 | Switzerland .................................. 251/63.5 |

*Primary Examiner*—Henry J. Recla
*Assistant Examiner*—Tuan Nguyen
*Attorney, Agent, or Firm*—Fish & Richardson P.C.

[57] ABSTRACT

An outlet valve is arranged in the bottom of a vessel intended to be filled with liquid comprising a valve disc (1) connected to a piston rod (4) and a piston (5) actuated by a pressure medium. The valve disc (1) is movable between a first and a second position and is arranged to bear against a valve seat (2) in its first closed position. The piston (5) is arranged in an operating device (6) provided with a connection (7) to a source for pressure medium. The operating device (6) is designed as a unit sealed from the liquid and is arranged at such a distance from the valve seat (2) that the liquid, when the valve is open, passes a zone between the operating device (6) and the valve seat (2).

5 Claims, 3 Drawing Sheets

OUTLET VALVE

FIELD OF THE INVENTION

The present invention relates to an outlet valve arranged in the bottom of a vessel intended to be filled with liquid comprising a valve disc connected to a piston rod and a piston actuated by a pressure medium. The valve disc is movable between a first and a second position and is arranged to bear against a valve seat in a first closed position.

BACKGROUND OF THE INVENTION

Outlet valves of this kind are usually arranged in a conduit out from the vessel, which means that special measures to protect the piston, which is actuated by pressure medium, from the liquid are not necessary.

However, if the valve is arranged in a vessel where the liquid freely flows past the outlet opening the valve mechanism is usually arranged outside the vessel and the movement of the valve disc takes places using different arrangements for the power transmission.

SUMMARY OF THE INVENTION

The outlet valve according to the invention is mainly characterized in that the piston which controls the movements of the valve disc is arranged in an operating device provided with a connection to a source for pressure medium. The operating device is arranged as a unit, the interior of which is sealed against the liquid and is arranged at such a distance from the valve seat that the liquid when leaving the vessel passes a zone between the operating device and the valve seat. According to the invention the operating device may be located above the valve seat, that is, it may be submerged in the liquid, as well as below the valve seat, that is located under the bottom of the vessel. The outlet valve according to the invention is designed such that the operating device is provided with two connections to the source for pressure medium, which connections lead to spaces in the operating device located on each side of the piston. With such a design both opening and closing of the valve are carried through by means of the pressure medium, which ensures a safe operation.

The valve according to the invention may advantageously be used for difficult applications, for example in vessels with liquid at a very high temperature. In such circumstances one can not rely on the working of a spring, since the carrying power of the spring may be affected by the heat.

According to the invention the operating device is advantageously connected to the valve seat. In this way there is obtained a solid unit which secures a movement of the piston, the piston rod and the valve disc, which is free from disturbances.

The valve according to the invention is advantageously designed such that the valve disc in the open position is situated on such a distance from the valve seat that the outlet opening is completely free. With such an arrangement a rapid emptying of the vessel is made possible.

If the operating device is arranged below the valve seat a shielding sheet in the shape of the cone is suitably arranged around the piston rod in the part which is turned towards the operating device. With such an arrangement both the piston rod and the operating device are protected and the liquid is led away from said part of the valve.

The valve disc is advantageously provided with a tube shaped part which concentrically surrounds the piston rod. This part surrounds also a second tube part firmly connected to the said cone shaped shielding sheet in the closed position of the valve. In this way it is avoided that possible particles in the liquid may hinder the movement of the piston rod.

Suitably the piston comprises piston rings separated by one or several sliding rings. These sliding rings may be produced of graphite impregnated teflon.

BRIEF DESCRIPTION OF THE DRAWINGS

The outlet valve according to the invention is described further with reference to the attached drawings, FIG. 1 of which partly in cross-section shows an outlet valve arranged in the bottom of the vessel.

DETAILED DESCRIPTION

Figure 1:
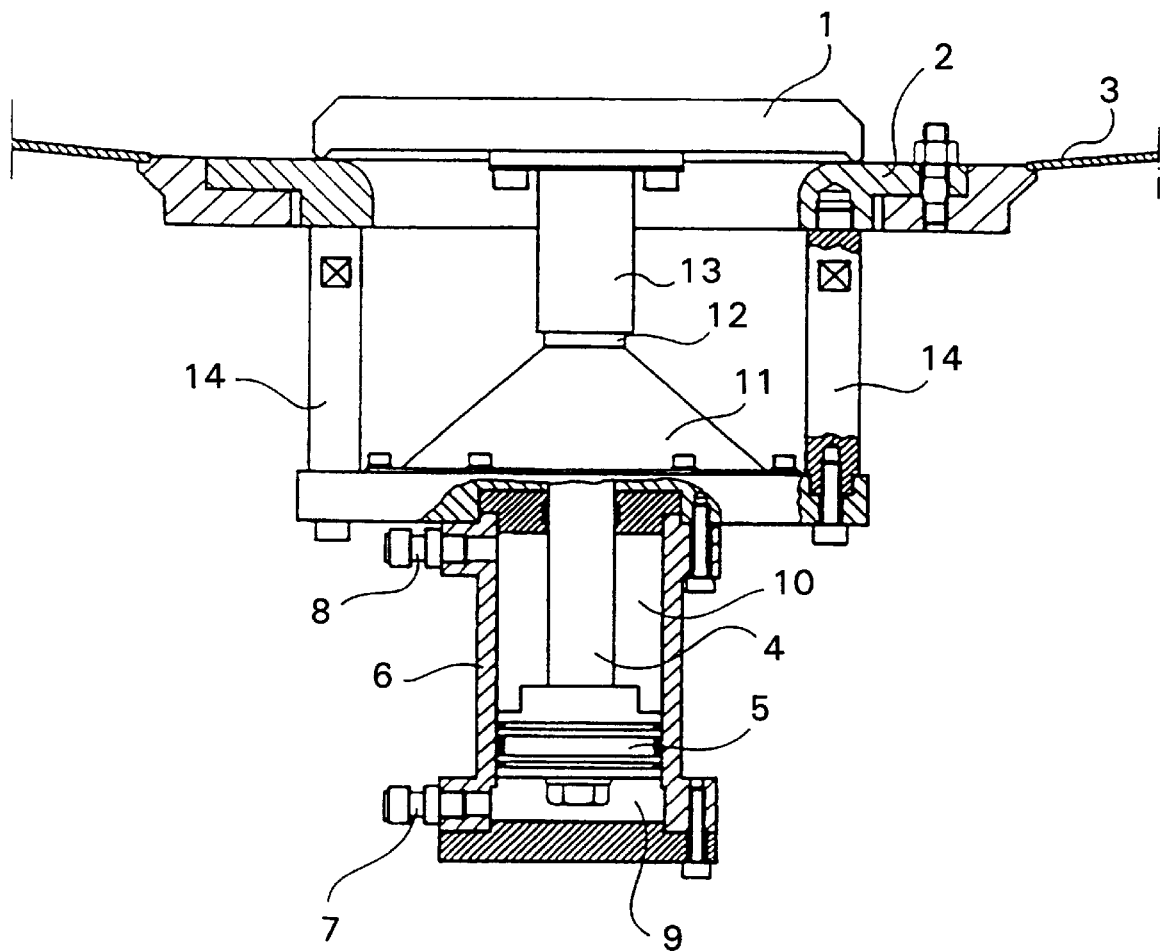

The outlet valve according to the invention is shown in FIG. 1 in a closed position, where the valve disc 1 bears against the valve seat 2. The valve seat is arranged in the bottom 3 of the vessel. The movement of the valve disc is controlled by a piston rod 4 connected to a piston 5 in an operating device 6. The operating device has also two connections 7,8 to a pressure medium. These connections leads to spaces 9, 10 on each side of the piston 5. The operating device is liquid tight and its interior is sealed against the environment. The piston rod 4 which is firmly connected to the valve disc 1 is surrounded by a cone shaped shielding sheet 11 in the part which is turned against the operating device and above the same of a first tube part 12. Outside of the same there is a second tube part 13 firmly connected to the valve disc with a somewhat larger diameter than the first tube part.

The operating device is connected to the valve seat by means of the number of supporting elements 14.

The piston 5 is assembled by piston rings separated by one or several sliding rings. The sliding rings are produced from graphite impregnated teflon.

The valve according to the invention works in the following way. In the normal position the valve is closed and the valve disc 1 bears against the valve seat 2. When the valve shall open the space 9 is put under pressure by way of the connection 7. The piston 5 and piston rod 4 are pressed upwards and the valve disc is lifted upwards and away from the valve seat against the liquid pressure in the vessel. The valve disc is lifted so high that the outlet area past the valve disc down towards and through the opening which is limited by the valve seat is completely free. The liquid is directed away from the operating device influenced by the cone shaped shielding sheet 11.

The valve is closed in that pressure medium is supplied to the space 10 through the connection 8. At the same time a connection (not shown) out from the space 9 is opened, such that earlier supplied pressure medium may leave the space 9.

Figure 2:
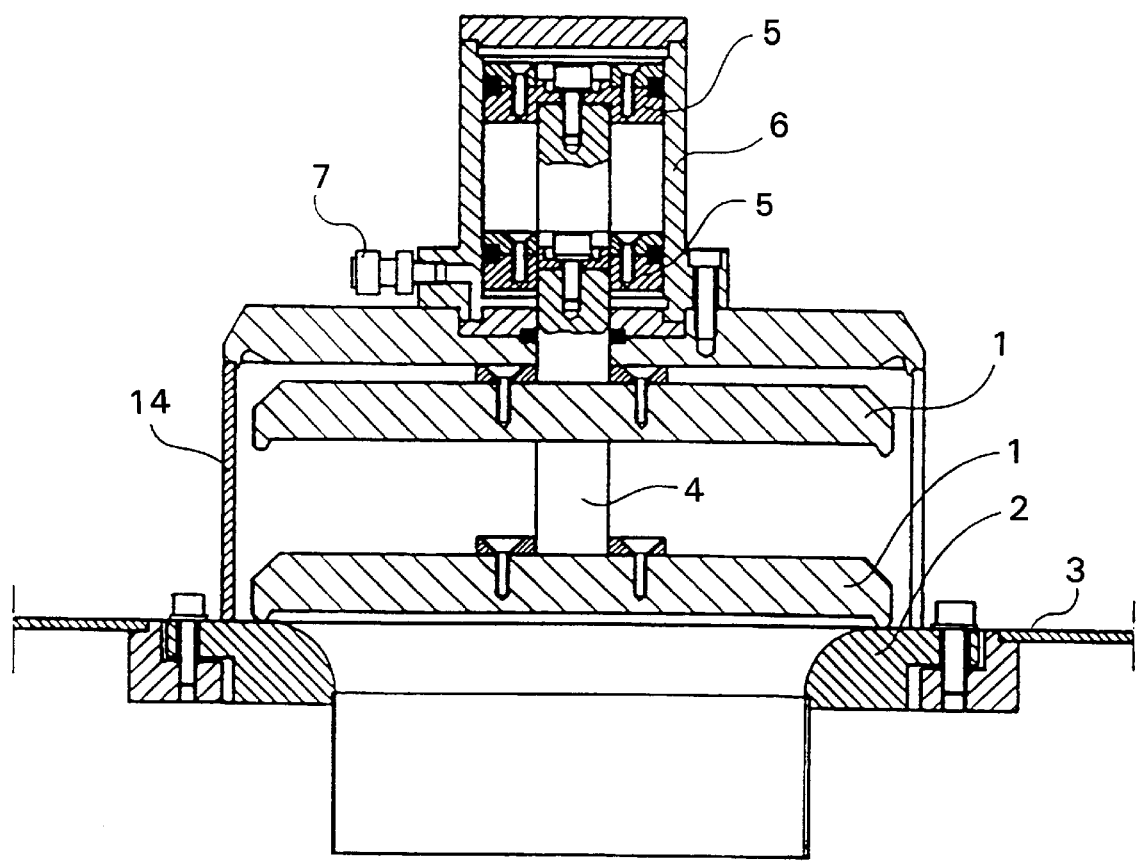
FIG. 2 shows another embodiment of a valve according to the invention where the operating device is arranged above the valve seat.

The outlet valve according to FIG. 2 has as may be seen on the drawing the operating device 6 arranged above the valve seat 2. The whole valve is in this arrangement arranged submerged in the liquid. The valve is as described in the earlier embodiment arranged in the bottom of the vessel. On the drawing the valve disc 1 is shown both in the open and the closed position of the valve. When the valve is closed the valve disc 1 bears against the valve seat 2. The piston 5 which by way of the piston rod 4 controls the position of the valve disc is then situated in its lower position. When the valve shall be opened the pressure medium is supplied through the connection 7 and the piston is pressed upwards, at which the valve disc is lifted upward to the position shown on the drawing. Also in this embodiment the operating device is firmly connected to the valve seat through supporting elements. These may for example comprise a number of symmetrically located rods. These give the desired mechanical resistance, but do not disturb the flow out from the valve.

Figure 3:
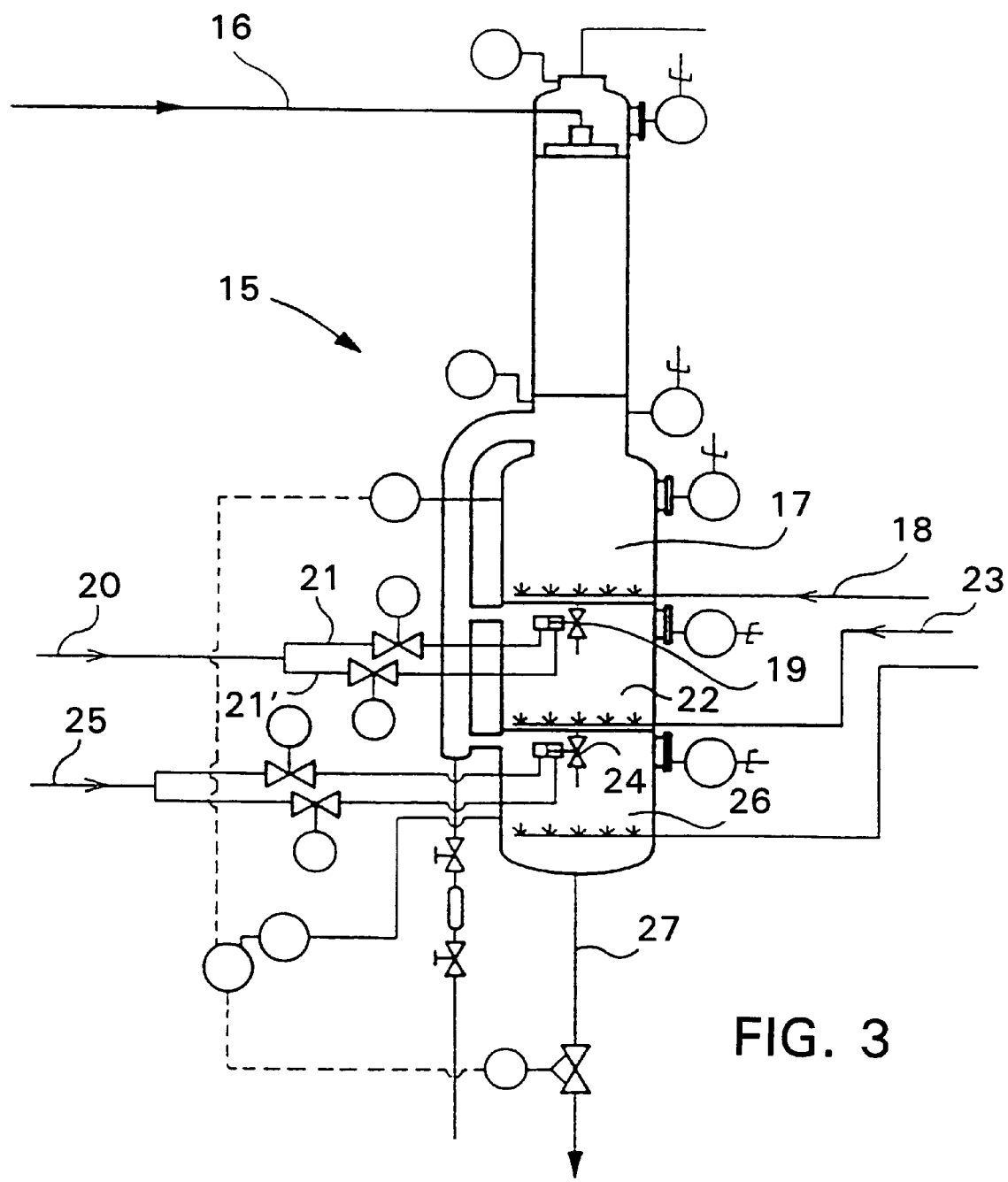
FIG. 3 shows how the valve according to the invention may be used in a refining plant for vegetable oils.

The FIG. 3 shows how the outlet valve according to the invention is arranged in the bottom of two steps in a deodorizing plant for vegetable oil.

To the plant 15 oil is supplied through a conduit 16. The oil flows downwards through the plant into a first room 17. To this stripping steam is supplied through the conduit 18. When the treatment is ended the valve 19 is opened by way of pressure medium which is supplied through the conduit 20. As may be seen on the drawing there are two conduits 21, 21' for pressure medium to the valve 19. This is opened and closed by supplying pressure medium to the operating device in the valve 19. When the valve has been opened the liquid flows down in to the next room 22 in the plant. Also in this space there is added stripping steam through the conduit 23. Also here there is an outlet valve 24 in the bottom of this space. The valve 24 is connected to a source for pressure medium through the conduit 25. From the room 22 the oil flows into the third room 26 where it is subjected to a final treatment with stripping steam before it leaves the plant by way of conduit 27. During this treatment the oil has a temperature of 250° C. In this plant steam under pressure is used to actuate the piston in the operating device. The conduits to the operating device consist of thin tubes of stainless steel.

Apart from steam under pressure, which is inert and cheap actuating medium, water, oil, air or nitrogen may be used as an actuating medium for the valve depending on the application.

The valve according to the invention is simple and sturdy and has only one movable part which guarantees a good operating security.

Depending on the desired performance of the valve the movement of the valve disc to an open position may take place rapidly or slowly. A slow moment may be obtained with a liquid driving medium or by throttling the delivery of driving medium.

With the proposed embodiment of the valve the emptying capacity may easily be changed by adapting the size of the valve seat and the valve disc to the desired diameter of the outlet opening.

In the description of the drawings the valve is shown arranged in the deodorizing plant for vegetable oil. The valve may of course be used in other plants for treatment of oils as bleaching or hardening. Also in other connections where a rapid emptying of the content in the vessel is desired or where high demands are confronted due to a difficult environment, for example high temperature, the valve according to the invention may be used advantageously.

What is claimed is:

1. An outlet valve adapted to be arranged in the bottom of a vessel intended to be filled with liquid comprising a valve disc (1) connected to a piston rod (4) and a piston (5) actuated by a pressure medium, said valve disc (1) being movable between a first position and a second position and being arranged to bear against a valve seat (2) in the first position, wherein the piston (5) is arranged in an operating device (6) provided with a connection (7) to a source for the pressure medium, said operating device (6) being designed as a unit, the interior of which is sealed against the liquid, the operating device (6) being connected to the valve seat (2) and arranged below said valve seat at such a distance from the valve seat (2) that the liquid, when the valve is in the second position, passes a zone between the valve seat (2) and the operating device (6), and the operating device (6) is provided with two connections (7,8) to the source for the pressure medium, said connections leading to spaces in the operating device (6) located on each side of the piston (5), wherein the piston rod (4) is surrounded by a shielding sheet (11) and wherein the valve disc (1) also comprises a tube shaped part (13) which is arranged to surround another tube shaped part (12) connected to said shielding sheet (11).

2. The outlet valve according to claim 1, wherein the valve disc (1) in its second position is located at such a distance from the valve seat (2) that the outlet opening is completely free.

3. An outlet valve adapted to be arranged in the bottom of a vessel intended to be filled with liquid comprising a valve disc (1) connected to a piston rod (4) and a piston (5) actuated by a pressure medium, said valve disc (1) being removable between a first position and a second position and being arranged to bear against a valve seat (2) in the first position, wherein the piston (5) is arranged in an operating device (6) provided with a connection (7) to a source for the pressure medium, said operating device (6) being designed as a unit, the interior of which is sealed against the liquid, the operating device (6) being connected to the valve seat (2) and arranged below said valve seat at such a distance from the valve seat (2) that the liquid, when the valve is in the second position, passes a zone between the valve seat (2) and the operating device (6), and the operating device (6) is provided with two connections (7, 8) to the source for the pressure medium, said connections leading to spaces in the operating device (6) located on each side of the piston (5), wherein the piston rod (4) is surrounded by a shielding sheet in a shape of a cone (11) and wherein the valve disc (1) also comprises a tube shaped part (13) which is arranged to surround another tube shaped part (12) connected to said shielding sheet (11) in the shape of the cone.

4. The outlet valve according to claim 1, wherein the piston comprises a plurality of piston rings separated by at least one sliding ring.

5. The outlet valve according to claim 4, wherein the at least one sliding ring comprises graphite impregnated teflon.

* * * * *